United States Patent [19]

Fukuba

[11] Patent Number: 5,523,787
[45] Date of Patent: Jun. 4, 1996

[54] SOLID-STATE IMAGING DEVICE ADAPTED FOR AN INTERLACED SCANNING AND A NON-INTERLACED SCANNING AND METHOD FOR DRIVING SAME

[75] Inventor: Nobuyuki Fukuba, Nara, Japan

[73] Assignee: Sharp Kabushiki Kaisha, Osaka, Japan

[21] Appl. No.: 393,255

[22] Filed: Feb. 23, 1995

Related U.S. Application Data

[63] Continuation of Ser. No. 89,428, Jul. 8, 1993, abandoned, which is a continuation of Ser. No. 846,361, Mar. 5, 1992, abandoned.

[30] Foreign Application Priority Data

Jun. 28, 1991 [JP] Japan .................................. 3-158696

[51] Int. Cl.$^6$ ...................................... H04N 5/335
[52] U.S. Cl. .......................... 348/319; 348/317; 348/320
[58] Field of Search .................................... 348/311, 316, 348/317, 320, 321, 322, 323, 294, 207, 220, 319; 257/215, 223, 232; H04N 5/335

[56] References Cited

U.S. PATENT DOCUMENTS

| | | | |
|---|---|---|---|
| 4,707,744 | 11/1987 | Kimata et al. | 358/213.26 |
| 4,750,041 | 6/1988 | Vogel | 358/213.22 |
| 4,752,829 | 6/1988 | Kim | 358/213.31 |
| 4,758,895 | 7/1988 | Elabd | 358/213.26 |
| 4,774,586 | 9/1988 | Koike | 358/213.29 |
| 4,972,254 | 11/1990 | Endo | 358/44 |
| 4,996,600 | 2/1991 | Nishida | 358/213.22 |
| 5,051,832 | 9/1991 | Losee | 358/213.29 |
| 5,287,192 | 2/1994 | Iizuka | 358/311 |

FOREIGN PATENT DOCUMENTS

| 3223849 | 6/1982 | Germany . |
|---|---|---|
| 58-47377 | 6/1983 | Japan . |

OTHER PUBLICATIONS

IEEE Transactions on Electron Devices, vol. 36, No. 11 (Nov. 1989).

Primary Examiner—Wendy R. Greening
Assistant Examiner—Tuan V. Ho
Attorney, Agent, or Firm—David G. Conlin; George W. Neuner; Brian L. Michaelis

[57] ABSTRACT

A solid-state imaging device comprising a full frame transfer vertical shift register. Signal charges stored in two sections, originally stored in two vertically adjacent pixels, are consecutively transferred to a horizontal shift register while the horizontal shift register is inoperative so as to be mixed together therein. Alternatively, a storage register is provided between the bottom section of the vertical shift register and the horizontal shift register so as to accept signal charges stored in two sections and mix them therein before transferring them to the horizontal shift register. In either case, the mixed signal charges are output as data corresponding to a moving image display. A still image display is possible using the same device by changing the timing for driving the vertical shift register or the storage register.

7 Claims, 3 Drawing Sheets

SOLID-STATE IMAGING DEVICE ADAPTED FOR AN INTERLACED SCANNING AND A NON-INTERLACED SCANNING AND METHOD FOR DRIVING SAME

This is a continuation of application Ser. No. 08/089,428, filed Jul. 8, 1993 abandoned which is a file wrapper continuation of Ser. No. 07/846,361 filed on Mar. 5, 1992, abandoned.

BACKGROUND OF THE INVENTION

1. Field of the Invention

The present invention relates to a solid-state imaging device such as an area CCD (charge coupled device) image sensor, and a method for driving such a solid-state imaging device.

2. Description of the Prior Art

One type of known solid-state imaging devices comprises full frame transfer vertical shift registers, in which signal charges stored in all light-receiving portions two-dimensionally arranged can be read individually at one time in a vertical direction. This type of solid-state imaging device is advantageous in that the resolution in the vertical direction is improved compared with a general type solid-state imaging device having the same number of light-receiving portions. The vertical direction as referred to in this specification means one of the two dimensional directions, while the other is referred to as the horizontal direction.

In a general type solid-state imaging device applied to a video camera of a standard TV system in which interlaced scanning is normally adopted, signals of two vertically adjacent pixels of different combinations are mixed so as to correspond to the interlaced scanning of the standard TV system. Therefore, the number of pixels in the vertical direction required for the general solid-state imaging device is equal to the total number of scannings in the standard TV system.

On the other hand, in a solid-state imaging device provided with the full frame transfer vertical shift registers, signals of all pixels are read individually in the vertical direction. Therefore, when this type of device is applied to the video camera of the standard TV system, the number of pixels in the vertical direction should be a half of the total number of scannings. As a result, the resolution in the vertical direction is deteriorated compared with a general type solid-state imaging device. When the solid-state imaging device provided with the full frame transfer vertical shift registers has the same number of pixels in the vertical direction as the general type device, the image information read therefrom can not be directly reproduced on a TV screen. In this case, the image information must be first recorded on a recording medium such as a magnetic disk, and then converted into data for TV display so as to be reproduced on a TV screen.

Because of the above-described limitation, the solid-state imaging device provided with the full frame transfer vertical shift registers has been mainly used for a camera for a still image display, for example, and has not been applied to a device such as a video camera for a moving image display.

The objective of the present invention is to provide a solid-state imaging device provided with full frame transfer vertical shift registers, which is capable of effecting a moving image display, in addition to a still image display, when applied to the standard TV system, and a method for driving such a device.

SUMMARY OF THE INVENTION

The solid-state imaging device of this invention, which overcomes the above-discussed and numerous other disadvantages and deficiencies of the prior art, comprises light-receiving portions two-dimensionally arranged, full frame transfer vertical shift registers each disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals, wherein the device comprises a storage registers disposed between the bottom section of the vertical shift register and the horizontal shift register so as to be driven independently from the vertical shift register.

According to another aspect of the present invention, there is provided a method for driving a solid-state imaging device including light-receiving portions two-dimensionally arranged, full frame transfer vertical shift registers each disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals, wherein the method comprises a step of disposing a storage registers between the bottom section of the vertical shift register and the horizontal shift register so as to drive the storage register independently from the vertical shift register, the storage register being driven at a timing adjusted with relation to the vertical shift register.

In a preferred embodiment, the storage register is driven at a different timing from the vertical shift register so that signal charges stored in two vertically adjacent light-receiving portions are mixed in the storage register and that the mixed signal charges are transferred to the horizontal shift register.

In a preferred embodiment, the storage register is driven at the same timing as the vertical shift register.

According to still another aspect of the present invention, there is provided a method for driving a solid-state imaging device including light-receiving portions two-dimensionally arranged, full frame transfer vertical shift registers each disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals, wherein signal charges stored in two sections of the vertical shift register are transferred to the horizontal shift register while the horizontal shift register is inoperative, so that the signal charges stored in two vertically adjacent light-receiving portions are mixed in the horizontal shift register.

Alternatively, there is provided a method for driving a solid-state imaging device including light-receiving portions two-dimensionally arranged, full frame transfer vertical shift registers each disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals, wherein a signal charge stored in one section of the vertical shift register is transferred to the horizontal shift register while the horizontal shift register is inoperative.

According to the solid-state imaging device of the present invention, the storage register is driven at a timing different from that of the vertical shift register so that signal charges stored in two sections of the vertical shift register, originally stored in two vertically adjacent light-receiving portions, can be consecutively transferred to the storage register, where the signal charges are mixed and then transferred to the horizontal shift register at one time.

Alternatively, the vertical shift register is driven at such a timing that signal charges stored in two sections of the vertical shift register, originally stored in two vertically adjacent light-receiving portions, can be consecutively transferred to the horizontal shift register so as to be mixed therein.

In either case, the mixed signal charges are transmitted through the horizontal shift register to the output portion. According to the above methods, the number of scannings per image is equal to that of the standard TV system adopting the interlaced scanning.

Therefore, according to the methods of the present invention, the image information read from the solid-state imaging device can be directly reproduced on a TV screen, so as to effect a moving image display. In this case, signals of two vertically adjacent pixels of one combination, and then those of a different combination, should be mixed so as to correspond to the interlaced scanning of the standard TV system.

On the other hand, when the storage register is driven at the same timing as the vertical shift register, or when a signal charge stored in one section of the vertical shift register is transferred to the horizontal shift register while the horizontal register is inoperative, signal charges are output as in the conventional method so as to effect a still image display.

Further, according to the present invention, it is not necessary to develop and manufacture solid-state imaging devices for the still image display and the moving image display separately, thereby widely reducing production cost as well as improving flexibility. Moreover, a high-density still image display can be obtained when reproduced by the same solid-state imaging device by switching the display mode during the moving image display.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
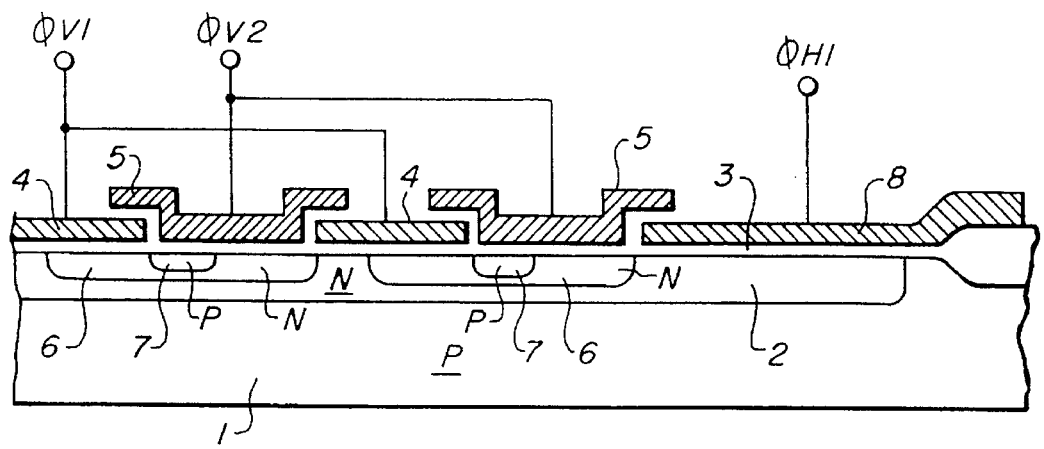
FIG. 1 is a partial sectional view of a solid-state imaging device to which a method of the present invention is applied, mainly showing the bottom part of a vertical shift register of the device.

FIG. 1 shows the bottom part of a vertical shift register for a solid-state imaging device to which the driving method of this example is applied. The vertical shift register adopting an interline transfer system comprises a plurality of sections each including a pair of transfer electrodes 4 and 5 forming a potential difference therebetween, so that signal charges stored in all of the receiving portions can be read at one time and transferred individually in the vertical direction (the direction in which the vertical shift register is disposed).

The structure and the driving method of the vertical shift register will be described. A buried channel layer 2 made of an n-type semiconductor is formed on an area of a p-type semiconductor substrate 1 corresponding to the whole area of the CCD transfer channel. The first-layer and second-layer transfer electrodes 4 and 5 are disposed alternately in the transfer direction (the vertical direction) on the p-type semiconductor substrate 1 through a thin insulating film 3 made of, for example, $SiO_2$. A transfer pulse $\phi V_1$ is applied to the first-layer transfer electrode 4 from a driving circuit (not shown). Likewise, a transfer pulse $\phi V_2$ is applied to the second-layer transfer electrode 5.

Figure 3A:
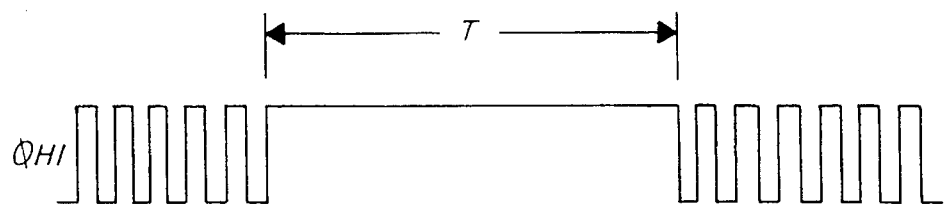
FIGS. 3A, 3B and 3C are timing charts showing the charge transfer operations of the solid-state imaging device of FIG. 1.

When the transfer pulses $\phi V_1$ and $\phi V_2$ are applied, a signal charge read from each of the light-receiving portions is transferred to the corresponding section of the vertical shift register through a shift gate connecting the light-receiving portions and the vertical shift register, and the signal charges are sequentially transferred through the vertical shift register at a predetermined timing until they reach the bottom section, where they are transferred to a horizontal shift register disposed perpendicular to the vertical shift register. A transfer pulse $\phi H_1$ as shown in FIG. 3A is applied to a transfer electrode 8 of the horizontal shift register. Thus, the horizontal shift register accepts the signal charges sent from the vertical shift register and transfers them to an output portion (not shown) at the timing of the pulse $\phi H_1$.

The transfer direction of the vertical shift register is established as described below. N-type impurities are implanted into a portion of the surface of the p-type semiconductor substrate 1 underlying a part of the transfer electrode 4 and the entire area of the transfer electrode 5, so as to form a first region 6. Then, a second region 7 is formed by implanting p-type impurities into a portion of the region 7 underlying a part of the transfer electrode 5.

Figure 2:
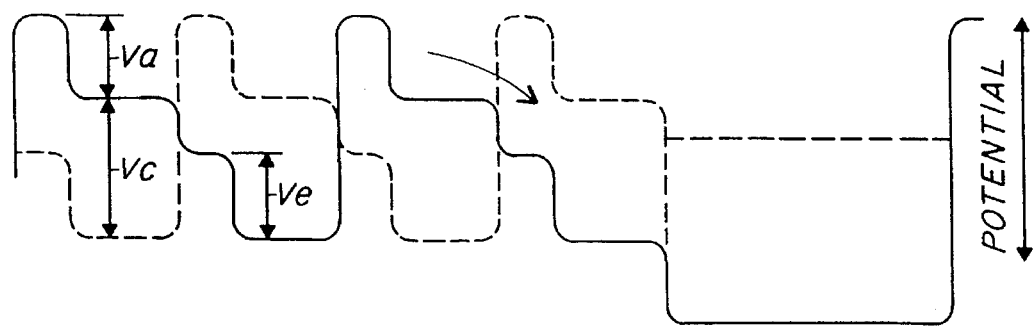
FIG. 2 is a potential distribution for the structure of FIG. 1.

A potential distribution of the above-described structure is shown in FIG. 2. The n-type impurities and the p-type impurities effect to increase the potentials by +Va and −Ve, respectively. In this way, a potential difference Va is formed under the transfer electrode 4 by the first region 6, and a potential difference Ve is formed under the transfer electrode 5 by the second region 7, thus establishing the transfer direction for signal charges. In this figure, Vc denotes a potential difference corresponding to a clock amplitude.

In the above-described structure, the amounts of the n-type and p-type impurities implanted to the regions 6 and 7 can be determined so that the potential differences +Va and −Ve are equal in their absolute values so as to compensate each other, thereby ensuring that the potential differences between the transfer electrodes 4 and 5 for establishing a direction are equalized. Thus, when the p-type impurities are implanted to the very place shown as the second region 7 in FIG. 1 under the above condition, the direction established by the potential differences formed under the transfer electrodes 4 and 5 can be the direction in which signal charges should be transferred. As a result, as shown in FIG. 3B, it is possible to effect a two-phase drive of the transfer pulses $\phi V_1$ and $\phi V_2$ under the same voltage application.

In FIG. 2, the solid line shows a potential when the transfer pulse $\phi V_1$ is low and the transfer pulse $\phi V_2$ is high, while the dash line shows a potential when the transfer pulse $\phi V_1$ is high and the transfer pulse $\phi V_2$ is low. The transfer direction is from left to right in the figure.

Next, referring to the timing charts of FIGS. 3A to 3C, a method for driving the solid-state imaging device of the above structure will be described. FIG. 3A shows the transfer pulse $\phi H_1$ applied to the transfer electrode 8 of the horizontal shift register. In the figure, T denotes an inoperative period of time of the horizontal shift register. FIG. 3B shows the transfer pulses $\phi V_1$ and $\phi V_2$ applied to the transfer electrodes 4 and 5, respectively. As is apparent from FIGS. 3A and 3B, a signal charge stored in one section of the vertical shift register is transferred to the horizontal shift register while the horizontal shift register is inoperative.

Figure 3B:
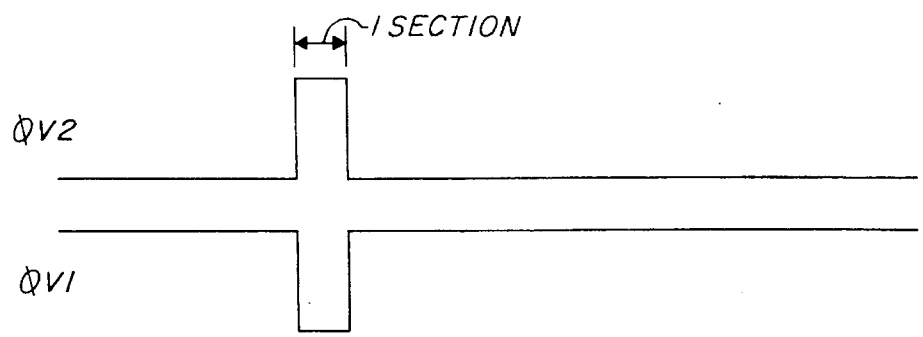

The transfer operation shown in FIG. 3B is adopted when the signal charges obtained from the solid-state imaging device are transferred as data for a still image display. On the other hand, for a moving image display, the transfer pulses $\phi V_1$ and $\phi V_2$ of FIG. 3C are applied to the transfer electrodes 4 and 5 from a driving circuit. In this case, the signal charges stored in two sections of the vertical shift register are consecutively transferred to the horizontal shift register while the horizontal shift register is inoperative. These signal charges are mixed in the horizontal shift register, and the mixed signal charges are then transferred to the output portion.

In the above-described transfer operation where the signal charges stored in two sections are mixed, the resultant output data has the same number of scannings in the vertical direction as the standard TV system adopting the interlaced scanning, so that the information transmitted from the solid-state imaging device can be directly reproduced on a TV screen. In this case, different combinations of two vertically adjacent pixels should be mixed so as to correspond to the interlaced scanning.

Figure 3C:
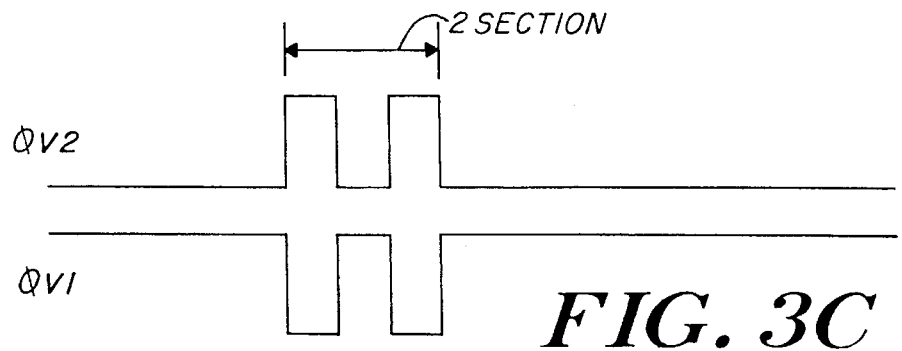

Accordingly, the timings of the transfer pulses $\phi V_1$ and $\phi V_2$ applied to the electrodes 4 and 5 as shown in FIGS. 3B and 3C can be selected corresponding to an output device, so as to obtain both a still image display and a moving image display. In other words, according to the driving method of this example, both the still image display and the moving image display are possible by one solid-state imaging device.

EXAMPLE 2

Figure 4:
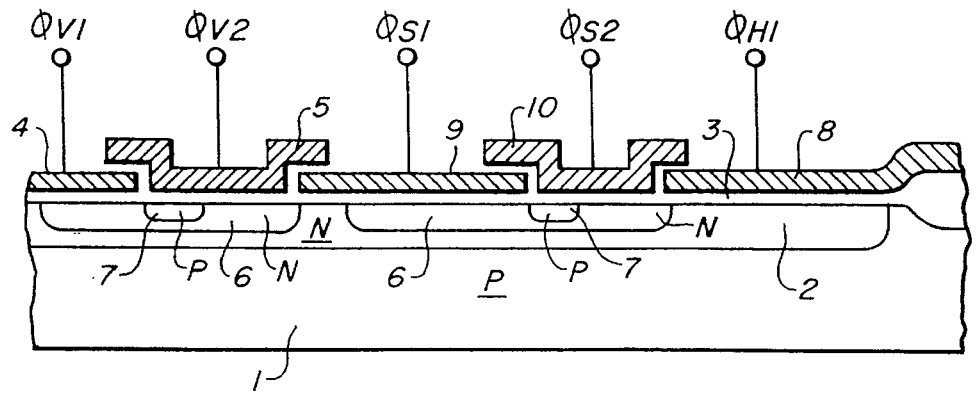
FIG. 4 is a partial sectional view of a solid-state imaging device of the present invention, mainly showing the bottom part of a vertical shift register of the device.

FIG. 4 shows the bottom part of a vertical shift resister for a solid-state imaging device according to the present invention. Since the structure of this example is mostly the same as that of Example 1 shown in FIG. 1, the description of the common parts denoted by the same reference numerals as those in FIG. 1 will be omitted here, and only parts different from Example 1 will be described as below.

Referring to FIG. 4, the solid-state imaging device of this example comprises a storage register which is located between the bottom section of the vertical shift register and the horizontal shift register and driven independently from the vertical shift register. The storage register includes transfer electrodes 9 and 10 which are disposed between the transfer electrode 5 of the bottom section of the vertical shift register and the transfer electrode 8 of the horizontal shift register. Transfer pulses $\phi S_1$ and $\phi S_2$ are applied to the transfer electrodes 9 and 10, respectively.

Figure 5A:
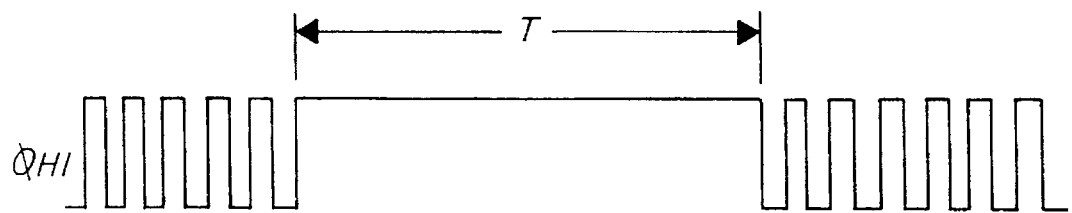
FIGS. 5A, 5B and 5C are timing charts showing the charge transfer operations of the solid-state imaging device of FIG. 4.
Figure 5B:
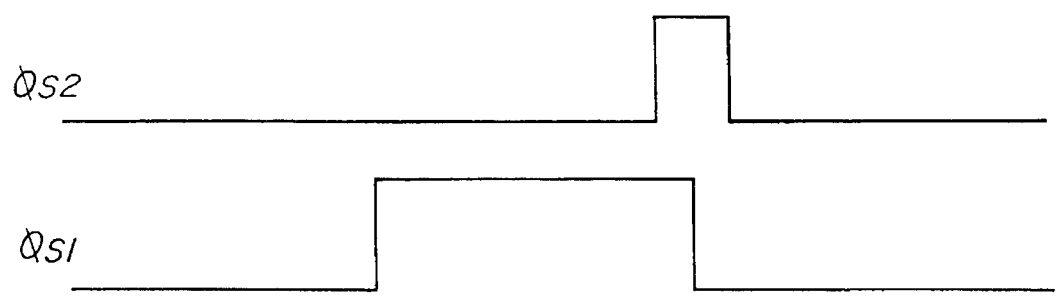
Figure 5C:
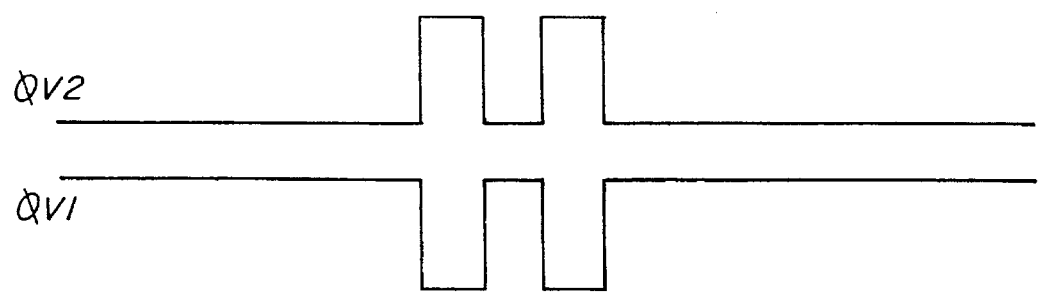

Referring to the timing charts of FIGS. 5A to 5C, the transfer operation of this example will be described. FIG. 5A, like FIG. 3A, shows the transfer pulse $\phi H_1$ applied to the transfer electrode 8 of the horizontal shift register. In the figure, T denotes an inoperative period of time of the horizontal shift register. FIG. 5B shows the transfer pulses $\phi S_1$ and $\phi S_2$ applied to the transfer electrodes 9 and 10 of the storage register, respectively. FIG. 5C shows the transfer pulses $\phi V_1$ and $\phi V_2$ applied to the transfer electrodes 4 and 5 of the vertical shift register, respectively.

As is apparent from FIGS. 5B and 5C, the transfer pulses $\phi S_1$ and $\phi S_2$ are applied to the storage register at such a timing that the signal charges stored in two sections of the vertical shift register, that is, the signal charges originally stored in two vertically adjacent pixels, are consecutively transferred to the storage register so as to be mixed therein and that the mixed signal charges are then transferred to the horizontal shift register at one time while the horizontal shift register is inoperative. In this way, a moving image display is realized. On the other hand, a still image display is possible when the storage register is driven at the same timing as the vertical shift register.

Accordingly, in this example, as in Example 1, both a still image display and a moving image display are possible by one solid-state imaging device by selecting the timing for driving the storage register as described above.

In Example 2, one storage register was provided for the vertical shift register, but a plurality of storage registers may be provided. Further, the vertical shift register of the two-phase drive system was used for applying the method of the present invention, but a three-phase or four-phase drive system is also applicable for this invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid-state imaging device including:

light-receiving portions two-dimensionally arranged; full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction;

a horizontal shift register for transferring the vertically-transferred signal charges in a horizontal direction; and an output portion for converting the horizontally-transferred signal charges into voltage signals;

wherein the device further comprises storage registers, each having only one section to store a signal charge and disposed only between the horizontal shift register and a bottom section of one of the vertical shift registers, the storage registers being driven independently from the vertical shift registers.

2. A solid-stage imaging device according to claim 1, wherein signal charges stored in two vertically adjacent light-receiving portions are consecutively transferred to the respective storage registers and are mixed in the respective storage registers.

3. A method for driving a solid-state imaging device including light-receiving portions two-dimensionally arranged, full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals; the method comprising a step of disposing each of storage registers which has only one section to store a signal charge only between the horizontal shift register and a bottom section of one of the vertical shift registers to drive the storage registers independently from the vertical shift registers, the storage registers being driven at a timing adjusted with relation to the vertical shift registers.

4. A method for driving a solid-stage imaging device including light-receiving portions two dimensionally arranged, full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals:

the method comprising, in the case where a moving image information is recorded, transferring signal charges stored in two sections of the vertical shift register to the horizontal shift register while the horizontal shift register is inoperative, so that the signal charges stored in two vertically adjacent light-receiving portions are mixed only in the horizontal shift register, and in the case where a still image information is recorded, transferring signal charges stored in one section of the vertical shift register to the horizontal shift register while the horizontal shift register is inoperative.

5. A method for driving a solid-stage imaging device including light-receiving portions two dimensionally arranged, full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals, the method comprising the steps of:

driving the solid-stage imaging device according to a first display mode, wherein signal charges stored in two sections of the vertical shift register are transferred to the horizontal shift register while the horizontal shift register is inoperative, so that the signal charges stored in two vertically adjacent light-receiving portions are mixed only in the horizontal shift register, and driving the solid-stage imaging device according to a second display mode, wherein a signal charge stored in one section of the vertical shift register is transferred to the horizontal shift register while the horizontal shift register is inoperative.

6. A method for driving a solid-stage imaging device including light-receiving portions two-dimensionally arranged, full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals:

the method comprising a step of disposing each of storage registers which have only one section to store a signal charge between the horizontal shift register and a bottom section of one of the vertical shift registers to drive the storage registers independently from the vertical shift registers, the storage registers being driven at a timing adjusted with relation to the vertical shift registers, wherein, in the case where moving image formation is recorded, the storage registers are driven at a different timing from the vertical shift register so that signal charges stored in two vertically adjacent light-receiving portions are mixed in the respective storage registers and so that the mixed signal charges are transferred to the horizontal shift register; and wherein, in the case where still image information is recorded, the storage registers are driven at the same timing as the vertical shift register so as to function as the vertical shift register.

7. A method for driving a solid-stage imaging device including light-receiving portions two-dimensionally arranged, full frame transfer vertical shift registers each having a plurality of sections and disposed adjacent to the light-receiving portions so that a signal charge stored in each light-receiving portion is individually transferred to the corresponding section of the vertical shift register at one time, the vertical shift register transferring the signal charges from section to section in a vertical direction, a horizontal shift register for transferring the vertically-transferred signal charges in a horizontal direction, and an output portion for converting the horizontally-transferred signal charges into voltage signals:

the method comprising a step of disposing each of storage registers which have only one section to store a signal charge between the horizontal shift register and a bottom section of one of the vertical shift registers to drive the storage registers independently from the vertical shift registers, the storage registers being driven at a timing adjusted with relation to the vertical shift registers, the method further comprising the steps of:

driving the solid-stage imaging device according to a first display mode, wherein the storage register registers are driven at a different timing from the vertical shift registers so that signal charges stored in two vertically adjacent light-receiving portions are mixed in the respective storage registers and that the mixed single charges are transferred to the horizontal shift registers, and driving the solid-stage imaging device according to a second display mode, wherein the storage registers are driven at the same timing as the vertical shift registers as to function as the vertical shift registers.

* * * * *